(12) United States Patent
Chen (10) Patent No.: US 8,605,052 B2
(45) Date of Patent: *Dec. 10, 2013

(54) METHOD FOR FILTERING OUT SIGNALS OF TOUCH DEVICE

(75) Inventor: Hsi-Kun Chen, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 825 days.

This patent is subject to a terminal disclaimer.

(21) Appl. No.: 12/241,069

(22) Filed: Sep. 30, 2008

(65) Prior Publication Data

US 2009/0284490 A1 Nov. 19, 2009

(30) Foreign Application Priority Data

May 16, 2008 (TW) ................................ 97118230 A (51) Int. Cl.
*G06F 3/045* (2006.01)
*G06F 3/041* (2006.01)

(52) U.S. Cl.
USPC ......................................... 345/174; 345/173

(58) Field of Classification Search
USPC .......... 345/173–178; 178/18.06, 18.01–20.04
See application file for complete search history.

(56) References Cited

U.S. PATENT DOCUMENTS

| | | | |
|---|---|---|---|
| 5,790,106 A * | 8/1998 | Hirano et al. | 345/173 |
| 2005/0052429 A1 | 3/2005 | Philipp | |
| 2005/0052432 A1 * | 3/2005 | Kraus et al. | 345/173 |
| 2006/0267953 A1 | 11/2006 | Peterson et al. | |
| 2006/0279551 A1 * | 12/2006 | Lii et al. | 345/173 |
| 2008/0309629 A1 * | 12/2008 | Westerman et al. | 345/173 |
| 2009/0284491 A1 * | 11/2009 | Chen et al. | 345/174 |

FOREIGN PATENT DOCUMENTS

| | | |
|---|---|---|
| CN | 1956335 | 5/2007 |
| TW | 200517928 | 6/2005 |
| TW | 200534176 | 10/2005 |
| TW | 200715167 | 4/2007 |

OTHER PUBLICATIONS

"Office Action of Taiwan Counterpart Application", issued on Aug. 19, 2011, p. 1-p. 4.
"1st Office Action of China Counterpart Application" issued on May 11, 2010, p. 1-p. 4.

* cited by examiner

*Primary Examiner* — Bipin Shalwala
*Assistant Examiner* — Ryan A Lubit
(74) *Attorney, Agent, or Firm* — Jianq Chyun IP Office

(57) ABSTRACT

A method for filtering out signals of a touch device includes following steps: first, obtaining a touch signal; next, obtaining signal intensity values respectively corresponding to a first sensing area, a second sensing area and a third sensing area according to the above-mentioned touch signal, wherein the above-mentioned second sensing area is located between the above-mentioned first sensing area and third sensing area; then discarding the touch signal if the signal intensity value of the above-mentioned second sensing area is less than the signal intensity values of the first sensing area and the third sensing area. In this way to discard the noise signal, the present invention is able to increase the accuracy and the stability of a capacitive touch device.

20 Claims, 6 Drawing Sheets

| 40 101 | 75 105 | 50 109 |
| --- | --- | --- |
| 55 104 | 102 | 60 106 |
| 50 107 | 60 108 | 103 |

METHOD FOR FILTERING OUT SIGNALS OF TOUCH DEVICE

CROSS-REFERENCE TO RELATED APPLICATION

This application claims the priority benefit of Taiwan application serial no. 97118230, filed on May 16, 2008. The entirety of the above-mentioned patent application is hereby incorporated by reference herein and made a part of specification.

BACKGROUND OF THE INVENTION

1. Field of the Invention

The present invention generally relates to a method for filtering out signals, in particular, to a method for filtering out noise produced by a capacitive touch device due to a radio-frequency interference source (RF interference source) or environment factors.

2. Description of Related Art

In order to make a portable information product use a more-humanized operation interface, it is the currently trend to integrate a touch panel or a touch pen into the information product. As a result, the relevant panel manufactures and IC (integrated circuit) design corporations focus on one of the significant development projects, the touch panel technique. Along with the developments, the relative techniques and products are applied in the daily electronic products, information products, for example, mobile phone, computer and personal digital assistant (PDA).

The touch device in the most common use is mainly categorized into resistive touch device and capacitive touch device, wherein the capacitive touch device works mainly based on sensing a signal according to a so-called capacitance electrical characteristic. When two electric conductor layers are not touched by each other but close to each other, the electric fields thereof are inter-acted to form a capacitor. In fact, the surfaces of the upper layer and the lower layer in a touch structure are two conductive layers respectively comprising a plurality of conductive layer formed by interlaced conductive traces of electrodes. Note that a human finger is an electric conductor. When a finger is put on a touch panel, a tiny capacitor is formed between the conductive traces of electrodes and the finger, and a microprocessor is used to detect the touch position of the finger of a user by sensing the capacitance variations.

Since a capacitive touch device is vulnerable to produce noise caused by environment variations, such as high-frequency interference source, temperature variation or electro-static discharge (ESD); consequently, abnormal sensed signals (noise) are produced by the capacitive touch device, which trigger a fault judgment with the electronic device and waste the electrical power.

SUMMARY OF THE INVENTION

Accordingly, the present invention is directed to a method for filtering out signals for discarding a noise-counted signal when the signal intensity of the surrounding area is greater than the signal intensity of the middle area, so that the noise produced by a radio-frequency interference source (RF interference source) or environment variations can be reduced and the accuracy and the stability of a capacitive touch device can be increased.

To achieve the above-mentioned or other objectives, the present invention provides a method for filtering out signals suitable for a touch device. The above-mentioned touch device includes a plurality of sensing areas. The above-mentioned method for filtering out signals includes following steps: first, obtaining a touch signal; next, obtaining signal intensity values respectively corresponding to a first sensing area, a second sensing area and a third sensing area according to the above-mentioned touch signal, wherein the above-mentioned second sensing area is located between the above-mentioned first sensing area and third sensing area; then discarding the above-mentioned touch signal if the signal intensity values of the above-mentioned second area is less than the signal intensity values of the above-mentioned first area and third area.

The present invention further provides a method for filtering out signals suitable for a touch device. The above-mentioned touch device includes a plurality of sensing areas. The above-mentioned method for filtering out signals includes following steps: first, obtaining a touch signal output from the above-mentioned touch device; next, obtaining signal intensity values respectively corresponding to a first sensing area, a plurality of second sensing areas and a third sensing area according to the above-mentioned touch signal, wherein the above-mentioned second sensing areas are located between the above-mentioned first sensing area and third sensing area so as to separate the above-mentioned first sensing area from third sensing area; then, discarding the above-mentioned touch signal if the signal intensity values of the above-mentioned second areas are less than the signal intensity values of the above-mentioned first area and third area.

The present invention further provides a method for filtering out signals suitable for a touch device. The above-mentioned touch device includes a plurality of sensing areas. The above-mentioned method for filtering out signals includes following steps: first, obtaining a touch signal output from the above-mentioned touch device; next, obtaining signal intensity values respectively corresponding to a plurality of first sensing areas and a plurality of second sensing areas according to the above-mentioned touch signal, wherein the above-mentioned first sensing areas are located surrounding the above-mentioned second sensing areas; then, discarding the above-mentioned touch signal if the signal intensity values of the above-mentioned second areas are less than all of the signal intensity values of the above-mentioned first areas.

In an embodiment of the present invention, in the step of judging whether or not the above-mentioned touch signal needs to be discarded, the decision of discarding the above-mentioned touch signal requires the signal intensity difference between the above-mentioned second sensing area and the above-mentioned first sensing area is greater than a preset value and the above-mentioned preset value is a non-zero real number.

In an embodiment of the present invention, in the step of judging whether or not the above-mentioned touch signal needs to be discarded, the decision of discarding the above-mentioned touch signal further requires the signal intensity difference between the above-mentioned second sensing area and the above-mentioned first sensing area is greater than a preset value and the above-mentioned preset value is a non-zero real number.

In an embodiment of the present invention, the signal intensity values of the above-mentioned first sensing area, second sensing area and third sensing area are respectively expressed by standardized numerical values.

In an embodiment of the present invention, the above-mentioned touch device includes a touch pad.

In an embodiment of the present invention, the above-mentioned touch device includes a capacitive touch device.

In an embodiment of the present invention, the above-mentioned touch device includes a capacitive touch component.

In an embodiment of the present invention, the locations of the above-mentioned sensing areas are arranged in a 3×3 block mode, a comb-shape mode or an arrow-shape mode.

Since the present invention identifies noise from normal signals by using the distribution of the signal intensity values and the scheme can be directly implemented through software or firmware, therefore, the present invention is advantageous in low cost and great commercial values. In addition, since the noise recognition in the present invention is implemented directly through, for example, image pattern recognition, numerical value analysis or looking-up table (LUT), the noise can be discarded in a great effect so as to increase the accuracy and the stability of a capacitive touch device, reduce the chance of wrong actions and further achieve a higher efficiency of usability and power-saving.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

When a capacitive touch device (for example, a touch screen or a touch pad) produces noise due to an RF interference source or environment factors, usually a plurality of spots (sensing areas) simultaneously outputs signals, wherein the sensing areas are stochastically distributed and the signal intensities within the sensing areas are distributed without a determinate rule, because the influences of noise or an RF interference source are non-linear and have unpredictable relationships. In contrast, if a conductor such as a finger or a touch pen touches a touch device and a touch signal is then produced, the touch signal is often presented at a single spot or within adjacent areas of the spot, and the distribution of the signal intensities usually is gradually descending from the most-inner to the most-outer or along a specific direction. The present invention utilizes the difference between the above-mentioned noise and the signal produced by a finger to discard noise by using the distribution of the signal intensity values. A signal intensity value is the signal intensity of an individual sensing area after a standardizing process, which is used to indicate the relative amount of the signal intensity of each sensing area.

When a touch signal is received, the distribution of the signal intensities corresponding to the touch signal is used by the embodiment for judging whether or not the touch signal is noise or a real signal input by a user, wherein the touch signal is obtained from the sensing areas of the touch device and the sensing area is just the area touched by, for example, a finger. In the present invention, when the signal intensity value of a middle sensing area is less (means a weaker signal intensity), the touch signal is treated as noise and discarded.

Figure 1:
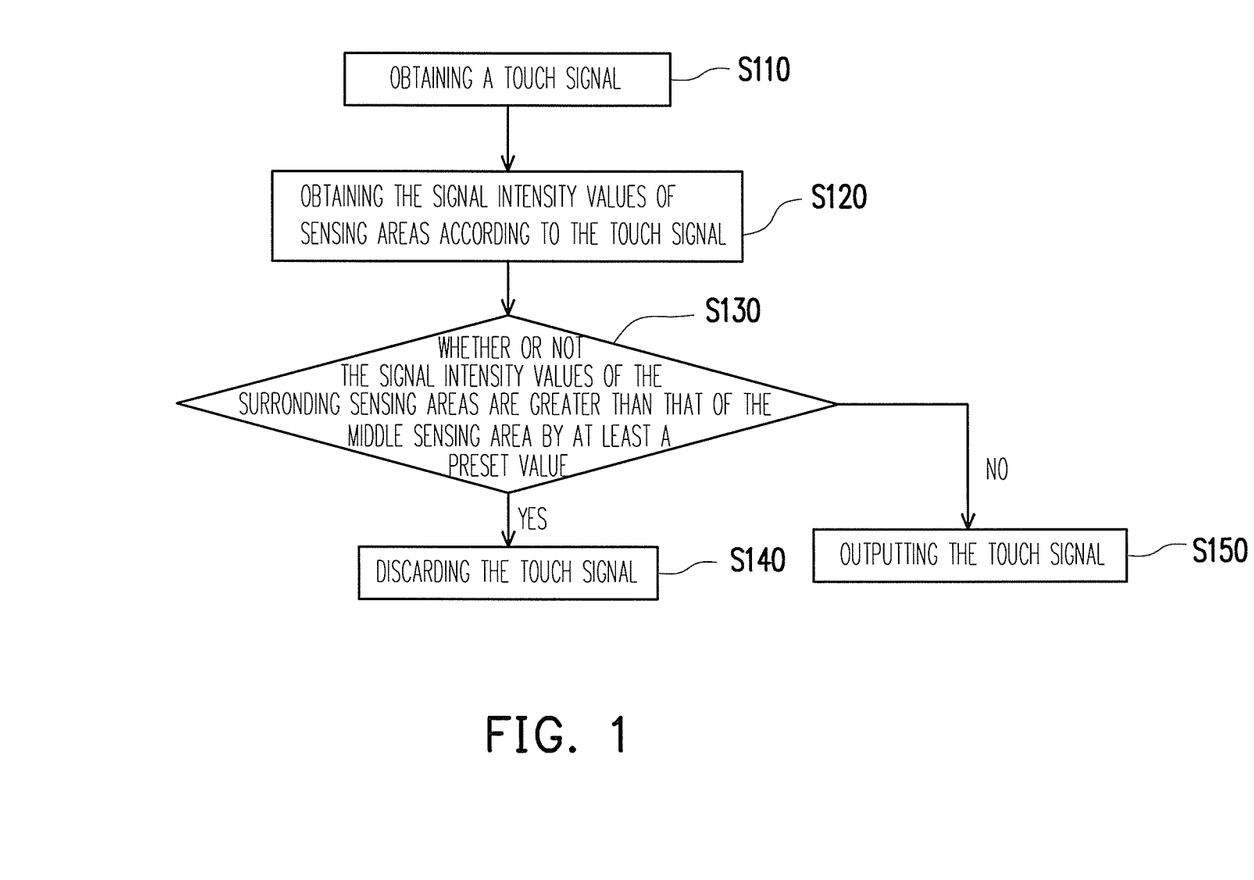
FIG. 1 is a flowchart of the method for filtering out noise signals according to an embodiment of the present invention.

FIG. 1 is a flowchart of the method for filtering out noise signals according to an embodiment of the present invention. First in step S110, a touch signal is obtained, wherein the touch device is, for example, a touch panel, a touch pad or a touch module. Every touch device includes a plurality of sensing areas for sensing the touch of a finger or a conductor. Next in step S120, the signal intensity values corresponding to the sensing areas are obtained according to the touch signal. In a normal situation, the sensing area having an output signal indicates a finger or a conductor touches the sensing area. Then in step S130, it is judged whether or not the signal intensity values of the surrounding areas are greater than the signal intensity value of the middle area by at least a preset value. If the differences between the signal intensity values of the surrounding areas and the signal intensity value of the middle area are greater than the preset value, the touch signal is discarded (step S140); otherwise, the touch signal is output (step S150).

In the above-mentioned step S130, the surrounding area and the middle area are defined depending on the layout of the sensing area and the place where noise occurs; but the judgment is based on a comparison between the signal intensity value of the sensing area located at the middle portion and the signal intensity value of the sensing area located at the surrounding portion and the distribution of the above-mentioned signal intensity values is used to judge whether or not the obtained touch signal is noise. Several distribution statuses are described hereinafter to explain how to identify a normal signal from noise in step S130.

Figure 2:
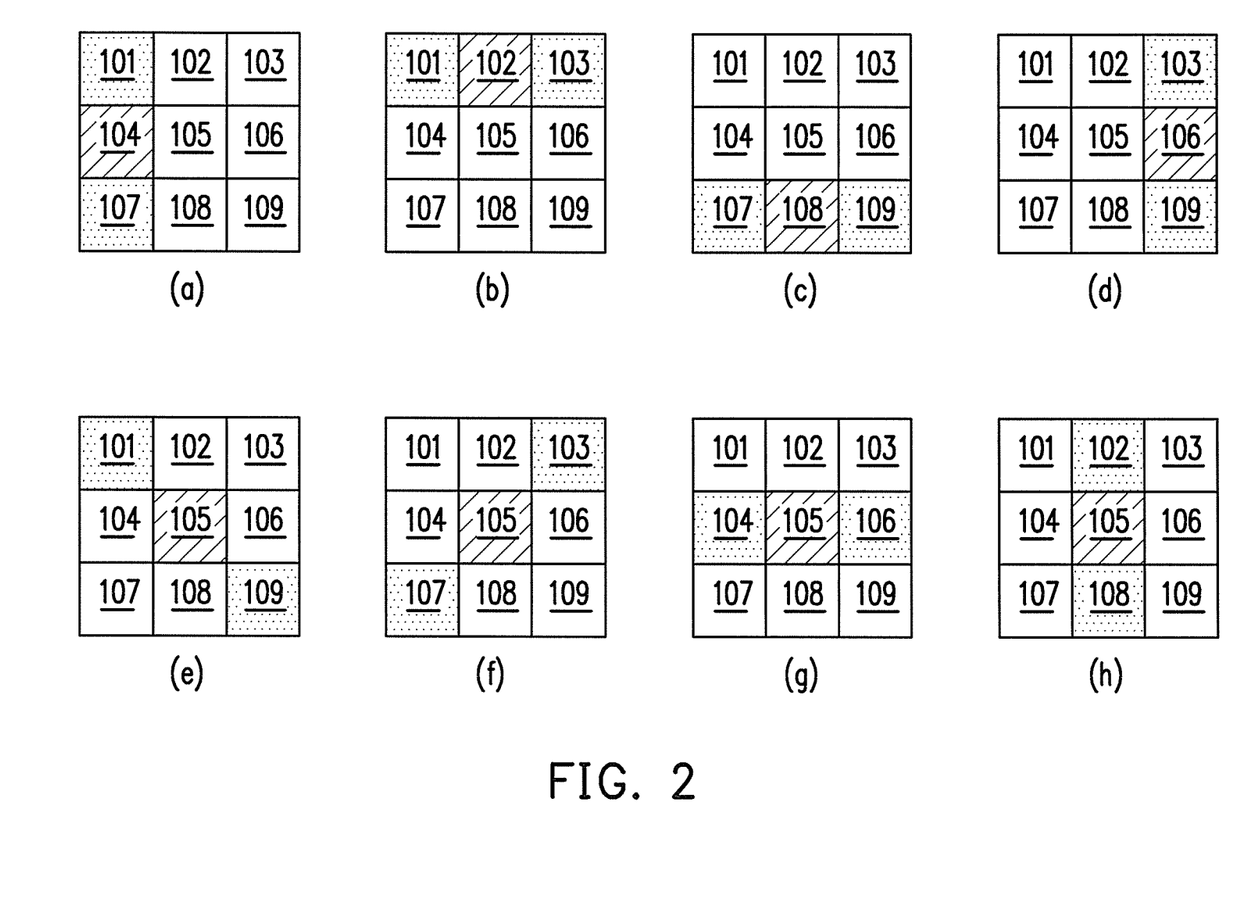
FIG. 2 is a diagram showing noise signal distribution in corresponding sensing areas according to an embodiment of the present invention.

Referring to FIG. 2, it is a diagram showing noise signal distribution in corresponding sensing areas according to an embodiment of the present invention. The embodiment takes a touch device in a 3×3 block mode (similar to one of the nine partitions in a Sudoku grid), wherein the sensing areas 101-109 are respectively a capacitive touch component. The layout of the capacitive touch components can be different, for example, a layout of a comb-shape mode or a layout of an arrow-shape mode, which are omitted for simplicity. First referring to FIG. 2(a), the sensing areas 101 and 107 are counted as the surrounding portion and the sensing area 104 between the sensing areas 101 and 107 is counted as the middle portion. In the embodiment, an area marked in dots represents a sensing area with a greater signal intensity value and an area marked in hatching represents a sensing area with a less signal intensity value and the difference between the above-mentioned dot area and the hatching area is greater than a preset value. As shown by FIG. 2(a), the signal intensity values of the sensing areas 101 and 107 are greater than that of the sensing area 104 and the differences are greater than the preset value. The preset value is defined depending on the design requirement, a less preset value has a higher sensitivity; in fact, the preset value can be a non-zero real number or zero.

In FIG. 2(a), assuming the standardized signal intensity values of the sensing areas 101, 104 and 107 are sequentially 70, 60 and 70 and the preset value is 5, then the difference between the sensing areas 101 and 104 is 10, the difference between the sensing areas 107 and 104 is 10 as well and both differences are greater than the preset value of 5. Therefore, the touch signal corresponding to FIG. 2(a) is treated as noise and discarded. On the other hand, assuming the standardized signal intensity values of the sensing areas 101, 104 and 107 are sequentially 70, 68 and 70; thus the touch signal is identified as a normal signal.

FIGS. 2(a)-2(h) illustrate several distributions of a noise signal. In the embodiment, a sensing area marked in hatching (for example, 102 in FIG. 2(b)) has a less signal intensity value and the surrounding areas marked in dots represent a sensing area with a greater signal intensity value (for example, 101 and 103 in FIG. 2(b)). When a finger or a touch pen touches a touch device, normally a greater signal intensity value is sensed corresponding to the middle sensing area; thus, FIGS. 2(a)-2(h) represent touch signals probably caused by noise and the touch signals need to be discarded.

Figure 3:
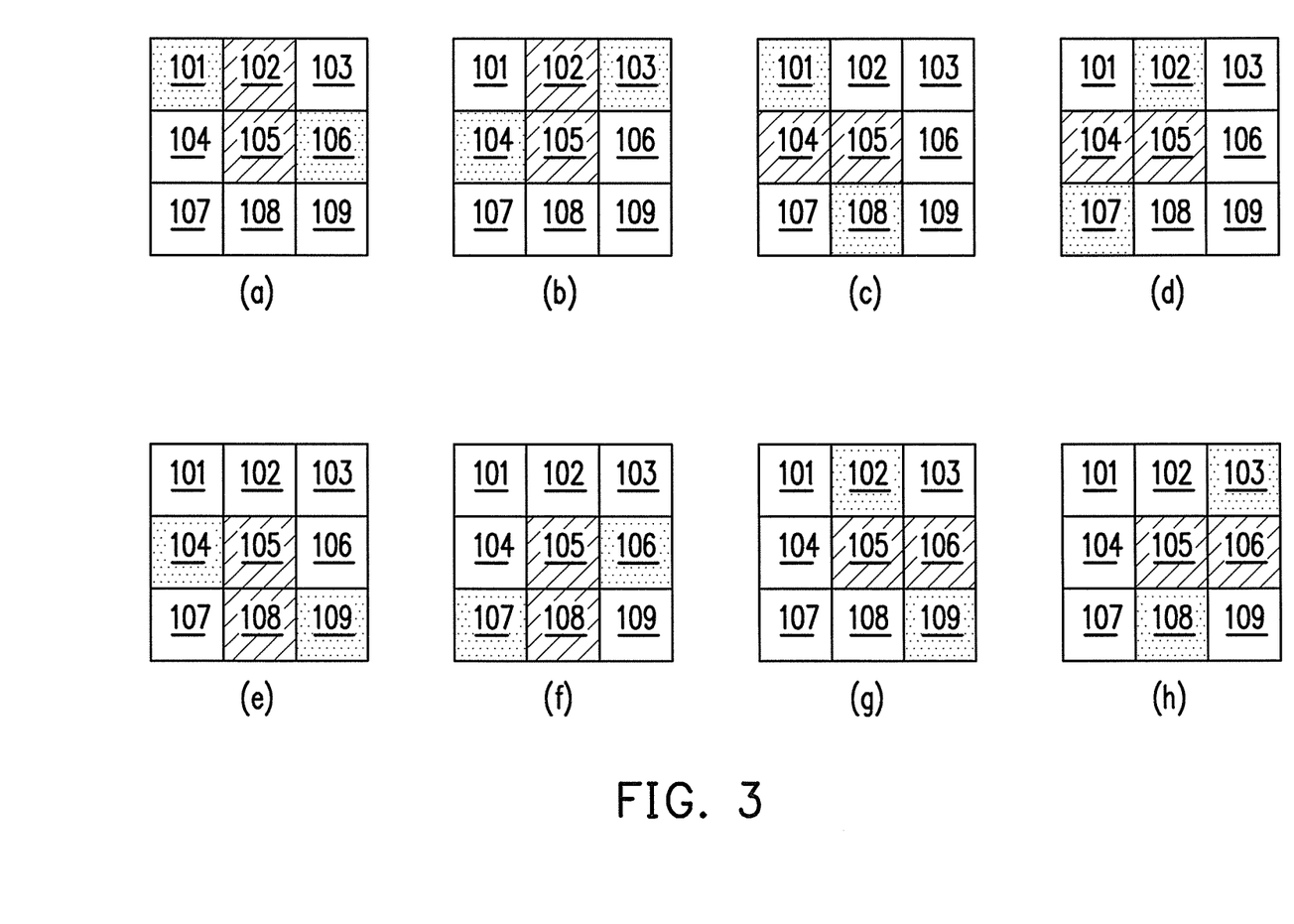
FIG. 3 is a diagram showing noise signal distribution in corresponding sensing areas according to another embodiment of the present invention.

FIG. 3 is a diagram showing noise signal distribution in corresponding sensing areas according to another embodiment of the present invention. Taking FIG. 3(a) as an example, the sensing areas 101, 102, 105 and 106 are corresponding to a touch signal, wherein the sensing areas 102 and 105 are located between the sensing areas 101 and 106, and the signal intensity values of the sensing areas 102 and 105 (marked in hatching) are less than that of the sensing areas 101 and 106 (marked in dots). Therefore, in the embodiment, the touch signal corresponding to FIG. 3(a) is identified as noise to be discarded. The situations of FIGS. 3(b)-3(h) are similar to FIG. 3(a), but the distributions within the sensing areas are different, wherein the signal intensity values of middle areas are less than that of the surrounding areas and all the situations in the embodiment are treated as noise to be discarded.

Figure 4:
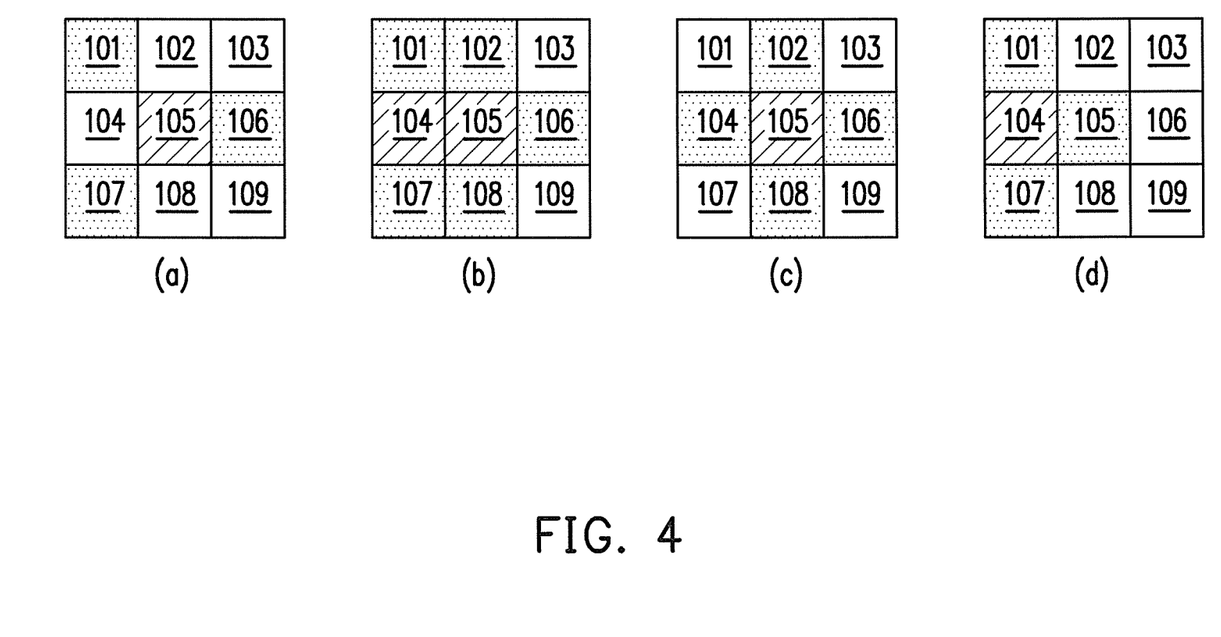
FIG. 4 is a diagram showing noise signal distribution in corresponding sensing areas according to yet another embodiment of the present invention.

FIG. 4 is a diagram showing noise signal distribution in corresponding sensing areas according to yet another embodiment of the present invention. FIGS. 4(a)-4(d) represent four noise distributions. Taking FIG. 4(c) as an example, the sensing areas 102, 104, 106 and 108 (marked in dots) are located surrounding the sensing area 105 (marked in hatching), wherein the signal intensity value of the sensing area 105 is the minimal one. Therefore, in the embodiment, the touch signal corresponding to FIG. 4(c) is identified as noise to be discarded. However, it is noted that if the signal intensity values of the sensing areas 102 and 104 are less than that of the sensing area 105 or the differences between the sensing areas 102 and 104 and the sensing area 105 are less than the preset value, the touch signal is treated as a normal signal. The situations of FIGS. 4(a), 4(b) and 4(d) are similar to FIG. 4(c), but the distributions within the sensing areas are different, wherein the signal intensity values of the middle areas are less than that of the surrounding areas and these situations in the embodiment are treated as noise to be discarded.

Figure 5:
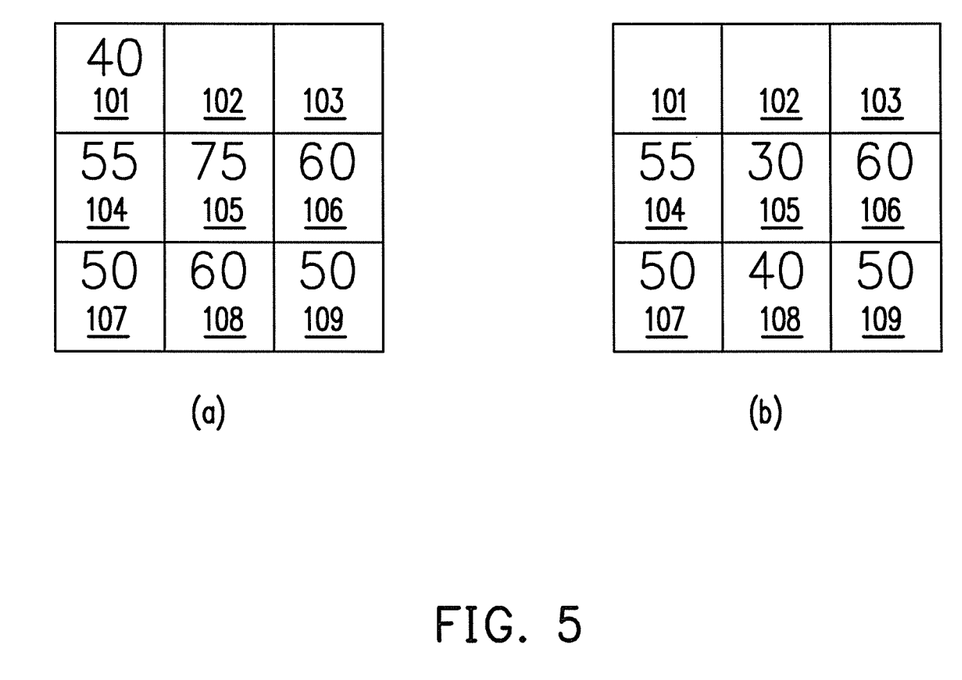
FIG. 5 is a diagram showing noise signal distribution in corresponding sensing areas according to an embodiment of the present invention

The difference between a normal signal and a noise signal can be expressed by numerical values. FIG. 5 is a diagram showing noise signal distribution in corresponding sensing areas according to an embodiment of the present invention. FIG. 5(a) represents a sensing area distribution corresponding to a normal touch signal and FIG. 5(b) represents a sensing area distribution corresponding to a noise signal. In FIG. 5(a), the sensing areas close to the middle area, for example 105 and 104, have signal intensity values of 75 and 55, and the surrounding sensing areas, for example 101, 107 and 109, have signal intensity values of 40, 50 and 50. The signal intensity values of the sensing areas 105 and 104 are greater than that of the sensing areas 101, 107 and 109. Therefore, in the embodiment, FIG. 5(a) is corresponding to a normal signal; the signal intensity values of the sensing areas 105 and 108 in FIG. 5(b) are respectively 30 and 40, all of which are less than the signal intensity values of the sensing areas 104, 107, 106 and 109 located at both sides of the sensing areas 105 and 108. Therefore, in the embodiment, the touch signal of FIG. 5(b) is noise to be discarded.

Note that in step S140, the comparison can be between the signal intensity values of all surrounding sensing areas and the middle sensing area or between the signal intensity values of any two surrounding sensing areas and the middle sensing area, which the present invention is not limited to. However, the stricter the comparison condition, the better the effect of removing noise is; the more tolerant the comparison condition, the faster the computation speed is and less the consumed resource is. In terms of the comparison way, the present invention adopts, for example but not limited by the present invention, image pattern recognition, numerical value analysis or looking-up table (LUT). In addition, if a touch signal is presented at a single sensing area or adjacent two sensing areas only, the touch signal is treated as a normal signal by the present invention.

Figure 6:
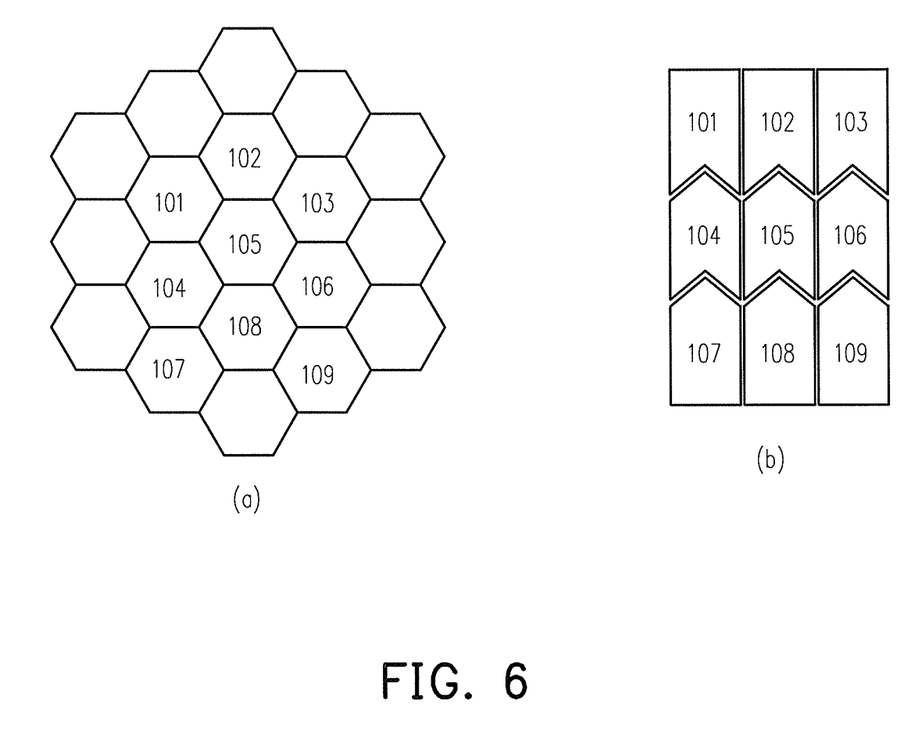
FIG. 6 is a diagram showing a comb-shape layout and an arrow-shape layout according to another embodiment of the present invention.

Though FIGS. 2-5 illustrate several sensing area distributions or a noise signal or a normal signal, but the present invention is not limited to. Anyone in skilled in the art can easily deduct other sensing area distributions of a noise signal or a normal signal, which are omitted for simplicity. Similarly, the present invention is not limited to the 3×3 block mode as well and other appropriate layouts are allowed to be used as shown by FIG. 6. FIG. 6(a) is a diagram showing a comb-shape layout in another embodiment and FIG. 6(b) is an arrow-shape layout according to another embodiment of the present invention. Other layouts suitable for a touch device of the present invention can be various, which are omitted for simplicity.

In summary, the present invention utilizes a signal intensity variation produced by noise or a normal signal to discard noise, reduce the influences of an RF interference source or environment factors on an electronic device. In this way, the present invention not only increases the accuracy and the stability of a capacitive touch device, but also reduces the fault actions of a system and thereby promotes the efficiency of usability and power-saving.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for filtering out signals, suitable for a touch device, wherein the touch device comprises a plurality of sensing areas, the method comprising:
   pre-configuring the entire touch device into a plurality of pre-configured sensing areas;
   obtaining a touch signal from the touch device;
   determining when the touch signal is considered noise to be discarded, the steps of determining comprising:
      in a location from which the touch signal originates, obtaining from within the plurality of the pre-configured sensing areas signal intensity values respectively corresponding to a first sensing area, a second sensing area, a third sensing area, and a fourth sensing area according to the touch signal wherein the second sensing area is located between and adjacent to the first sensing area and the third sensing area in opposite sides and another side of the second sensing area other than the opposite sides is directly adjacent to the fourth sensing area which is corner way adjacent to the first sensing area and the third sensing area; and discarding the touch signal when the signal intensity value of the second area is greater than zero and less than the signal intensity values of the first area and the third area and the fourth area.

2. The method for filtering out signals according to claim 1, wherein in the step of judging whether or not to discard the touch signal, the decision of discarding the touch signal requires the signal intensity difference between the second sensing area and the first sensing area is greater than a preset value and the preset value is a non-zero real number.

3. The method for filtering out signals according to claim 1, wherein in the step of judging whether or not to discard the touch signal, the decision of discarding the touch signal further requires the signal intensity difference between the second sensing area and the third sensing area is greater than a preset value and the preset value is a non-zero real number.

4. The method for filtering out signals according to claim 1, wherein the signal intensity values of the first sensing area, the second sensing area and the third sensing area are respectively expressed by a standardized numerical value.

5. The method for filtering out signals according to claim 1, wherein the touch device comprises a touch panel or a touch pad.

6. The method for filtering out signals according to claim 1, wherein the touch device is a capacitive touch device.

7. The method for filtering out signals according to claim 1, wherein each of the sensing areas comprises a capacitive touch component.

8. The method for filtering out signals according to claim 1, wherein the locations of the sensing areas are arranged in a 3×3 block mode, a comb-shape mode or an arrow-shape mode.

9. The method for filtering out signals according to claim 1 further comprising:

when it is not determined that the touch signal is considered noise to be discarded, then the touch signal is considered to be a genuine touch signal.

10. A method for filtering out signals, suitable for a touch device, wherein the touch device comprises a plurality of sensing areas, the method comprising:

pre-configuring the entire touch device into a plurality of pre-configured sensing areas;

obtaining a touch signal output from the touch device;

determining when the touch signal is considered noise to be discarded, the steps of determining comprising:

in a location from which the touch signal originates, obtaining from within the plurality of the pre-configured sensing areas signal intensity values respectively corresponding to a first sensing area, a plurality of second sensing areas, a third sensing area, and a fourth sensing area according to the touch signal wherein the second sensing areas are located between and adjacent to the first sensing area and the third sensing area to separate the first sensing area from the third sensing area in opposite sides, and another side other than the opposite sides of the plurality of the second sensing areas is directly adjacent to the fourth sensing area which is cornerway adjacent to either the first sensing area or the third sensing area; and discarding the touch signal when the signal intensity values of the second areas are greater than zero and less than all of the signal intensity values of the first area and the third area and the fourth area.

11. The method for filtering out signals according to claim 10, wherein in the step of judging whether or not to discard the touch signal, the decision of discarding the touch signal requires the signal intensity differences between the second sensing areas and the first sensing area are greater than a preset value and the preset value is a non-zero real number.

12. The method for filtering out signals according to claim 10, wherein in the step of judging whether or not to discard the touch signal, the decision of discarding the touch signal further requires the signal intensity differences between the second sensing areas and the third sensing area are greater than a preset value and the preset value is a non-zero real number.

13. The method for filtering out signals according to claim 10, wherein the preset value is a positive number or zero.

14. The method for filtering out signals according to claim 10, wherein the signal intensity values of the first sensing area, the second sensing areas and the third sensing area are respectively expressed by standardized numerical values.

15. The method for filtering out signals according to claim 10, wherein the touch device comprises a touch panel or a touch pad.

16. The method for filtering out signals according to claim 10, wherein the touch device is a capacitive touch device.

17. The method for filtering out signals according to claim 10, wherein each of the sensing areas comprises a capacitive touch component.

18. The method for filtering out signals according to claim 10, wherein the locations of the sensing areas are arranged in a 3×3 block mode, a comb-shape mode or an arrow-shape mode.

19. A method for filtering out signals, suitable for a touch device, wherein the touch device comprises a plurality of sensing areas, the method comprising:

pre-configuring the entire touch device into a plurality of pre-configured sensing areas;

obtaining a touch signal output from the touch device;

determining when the touch signal is considered noise to be discarded, the steps of determining comprising:

in a location from which the touch signal originates, obtaining from within the plurality of the pre-configured sensing areas signal intensity values respectively corresponding to four first sensing areas and a second sensing area having four sides according to the touch signal, wherein each of the first sensing areas is adjacent to a different side of the four sides of the second sensing area which is in the middle of the four first sensing areas; and discarding the touch signal when the signal intensity values of the second area is less than all of the signal intensity values of the four first areas.

20. The method for filtering out signals according to claim 19, wherein in the step of judging whether or not to discard the touch signal, the decision of discarding the touch signal requires all of the signal intensity differences between the second sensing area and each of the first sensing areas to be greater than a preset value and the preset value is a non-zero real number.

* * * * *